United States Patent
Benzatti et al.

(10) Patent No.: US 11,375,013 B2
(45) Date of Patent: Jun. 28, 2022

(54) DETERMINISTIC MAPPING AND UNIFORM ROUTING OF ITEMS TO PHYSICAL RESOURCES USING HASH VALUES

(71) Applicant: Microsoft Technology Licensing, LLC, Redmond, WA (US)

(72) Inventors: Danilo Landucci Benzatti, Seattle, WA (US); Ahmed Hassan Mohamed, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/032,466

(22) Filed: Sep. 25, 2020

(65) Prior Publication Data

US 2022/0103626 A1 Mar. 31, 2022

(51) Int. Cl.
*G06F 15/177* (2006.01)
*H04L 67/1097* (2022.01)
*H04L 67/1023* (2022.01)
*H04L 67/1025* (2022.01)

(52) U.S. Cl.
CPC ...... *H04L 67/1097* (2013.01); *H04L 67/1023* (2013.01); *H04L 67/1025* (2013.01)

(58) Field of Classification Search
CPC ............. H04L 67/1097; H04L 67/1025; H04L 67/1023; G06F 16/2255; G06F 16/9014
USPC .................................................. 709/221, 226
See application file for complete search history.

(56) References Cited

U.S. PATENT DOCUMENTS

| | | | |
|---|---|---|---|
| 8,671,151 B2 | 3/2014 | Joshi et al. | |
| 8,996,535 B1 | 3/2015 | Kimmel | |
| 10,705,101 B2 | 7/2020 | Breslow et al. | |
| 2011/0191389 A1 | 8/2011 | Okamoto | |
| 2012/0143877 A1* | 6/2012 | Kumar | G06F 16/9014 707/747 |
| 2013/0007008 A1 | 1/2013 | Yuan et al. | |
| 2013/0263151 A1 | 10/2013 | Li et al. | |
| 2013/0283287 A1 | 10/2013 | Lyle | |
| 2015/0095346 A1 | 4/2015 | Kimmel et al. | |
| 2015/0095347 A1* | 4/2015 | Kimmel | G06F 3/0608 707/747 |
| 2016/0210340 A1* | 7/2016 | Cai | G06F 16/217 |
| 2017/0177266 A1* | 6/2017 | Doerner | G06F 12/0261 |
| 2017/0220290 A1* | 8/2017 | Boddu | G06F 3/067 |
| 2018/0089188 A1 | 3/2018 | Kharisma et al. | |
| 2020/0026567 A1* | 1/2020 | Lorenz | G06F 9/5061 |
| 2020/0159726 A1* | 5/2020 | Miller | G06F 16/2455 |

(Continued)

OTHER PUBLICATIONS

"Consistent Hashing", Retrieved from: https://kb.novaordis.com/index.php/Consistent_Hashing. Retrieved Date Sep. 2, 2020, 3 Pages.

(Continued)

*Primary Examiner* — Johnny B Aguiar
(74) *Attorney, Agent, or Firm* — Christopher J. Volkmann; Kelly, Holt & Christenson PLLC

(57) ABSTRACT

A string, identifying an item to be assigned to a physical resource, is hashed to obtain a numeric hash value. The numeric hash value is downscaled to obtain a bucket identifier that identifies a bucket that will hold the numeric hash value. The bucket is then deterministically mapped to a physical resource so that it can be retrieved without accessing a stored data structure representative of the mapping.

16 Claims, 6 Drawing Sheets

(56) References Cited

U.S. PATENT DOCUMENTS

2020/0204626 A1* 6/2020 Zhang .................... H04L 67/42
2020/0287831 A1* 9/2020 Lam ..................... H04L 47/125

OTHER PUBLICATIONS

Jenkins, Bob, "SpookyHash: a 128-bit noncryptographic hash-", Retrieved from: http://wwww.burtleburtle.net/bob/hash/spooky.html, Jan. 29. 2012, 2 Pages.

Karger, et al., "Consistent hashing and random trees: distributed caching protocols for relieving hot spots on the World Wide Web", In Proceedings of the twenty-ninth annual ACM symposium on Theory of computing, May 1997, pp. 654-663.

Lamping, et al., "A Fast, Minimal Memory, Consistent Hash Algorithm", In Repository of arXiv preprint arXiv: 1406.2294. Jun. 9, 2014, pp. 1-12.

Srushtika, Neelakantam, "How we Efficiently Implemented Consistent Hashing", Retrieved from: https://www.ably.lo/blog/implementing-efficient-consistent-hashing/, Jun. 19, 2018, 21 pages.

Thaler, et al., "A Name-Based Mapping Scheme for Rendezvous", In Technical Report CSE-TR-316-96, Nov. 13. 1996, 31 Pages.

"International Search Report and Written Opinion Issued in PCT Application No. PCT/US21/036072", dated Sep. 23, 2021, 11 Pages.

* cited by examiner

US 11,375,013 B2

1

DETERMINISTIC MAPPING AND UNIFORM ROUTING OF ITEMS TO PHYSICAL RESOURCES USING HASH VALUES

BACKGROUND

Computer systems are currently in wide use. Some computer systems are distributed systems in which components of a computing system are located on different physical machines which are connected over a network.

For example, some current distributed computing systems include data storage systems. In such systems, data is stored on a plurality of different physical storage devices (or physical resources, also referred to herein as nodes). When a request to store a data item is received by the computing system, the computing system stores the data on one or more of the different physical data stores.

Another example of a distributed computing system is a hosted service in which a plurality of different service instances are deployed on different physical machines. Requests from computing systems that are accessing the hosted service are received and routed to one or more of the different service instances on the different physical machines.

These are just two examples of distributed computing systems. There are a wide variety of other distributed computing systems in which requests are serviced or otherwise executed by components disposed on one of a plurality of different physical machines.

Therefore, these types of distributed systems often map items to a set of physical resources. Those resources can be components (such as service instances) deployed on different physical machines, different physical databases, etc. In such systems, resizing is often performed, in which nodes of the distributed computing system are added or removed. Thus, current distributed computing systems attempt to use an approach for mapping items to the different nodes, in a way that reduces the number of items that need to be moved when the system adds or removes a node.

The discussion above is merely provided for general background information and is not intended to be used as an aid in determining the scope of the claimed subject matter.

SUMMARY

A string, identifying an item to be assigned to a physical resource, is hashed to obtain a numeric hash value. The numeric hash value is downscaled to obtain a bucket identifier that identifies a bucket that will hold the numeric hash value. The bucket is then deterministically mapped to a physical resource so that it can be retrieved without accessing a stored data structure representative of the mapping.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

2

Figure 1:
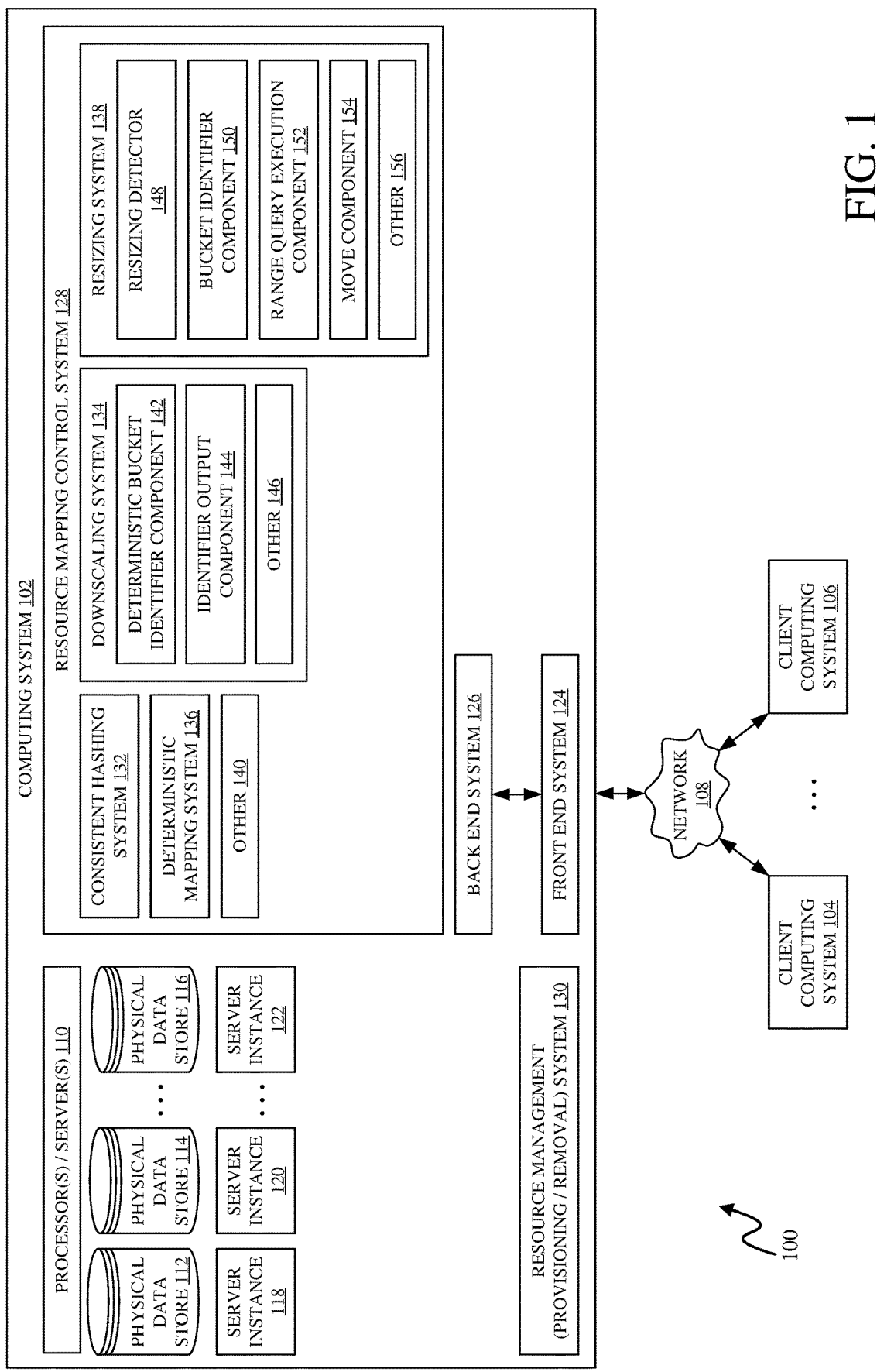
FIG. 1 is a block diagram showing one example of a computing system architecture.
Figure 2:
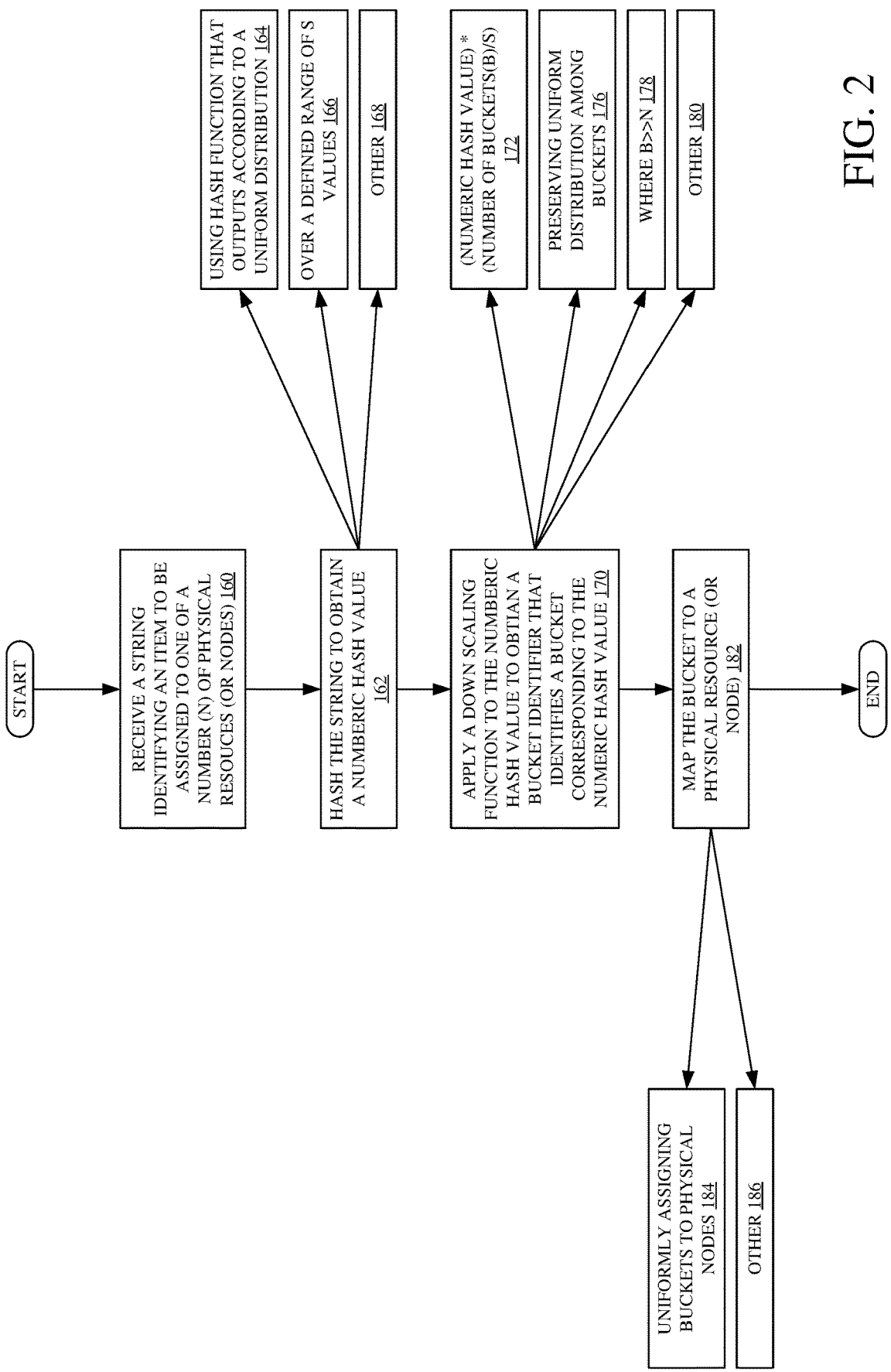

FIG. 2 is a flow diagram illustrating one example of the operation of the architecture illustrated in FIG. 1 in mapping an item to a node.

Figure 3:
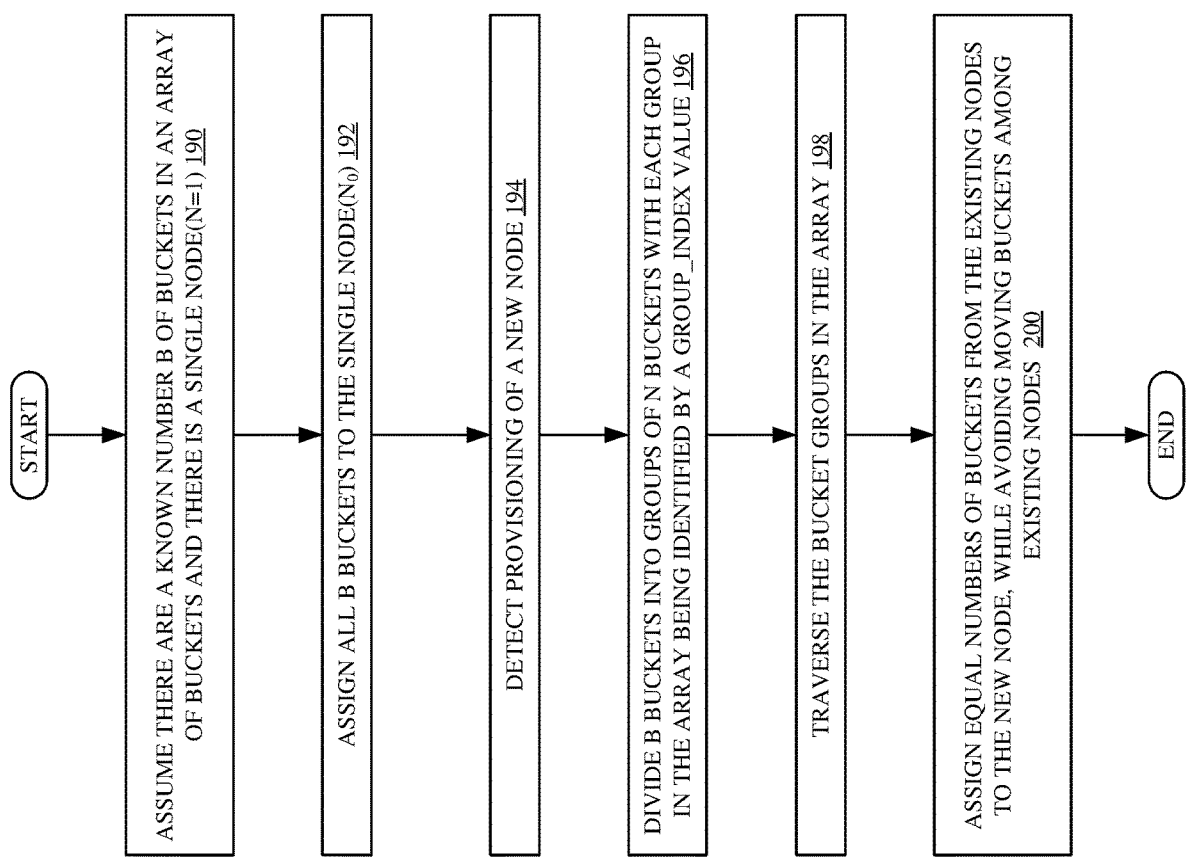

FIG. 3 is a flow diagram illustrating one example of the operation of the architecture shown in FIG. 1 in moving items among the nodes during downsizing.

Figure 4:
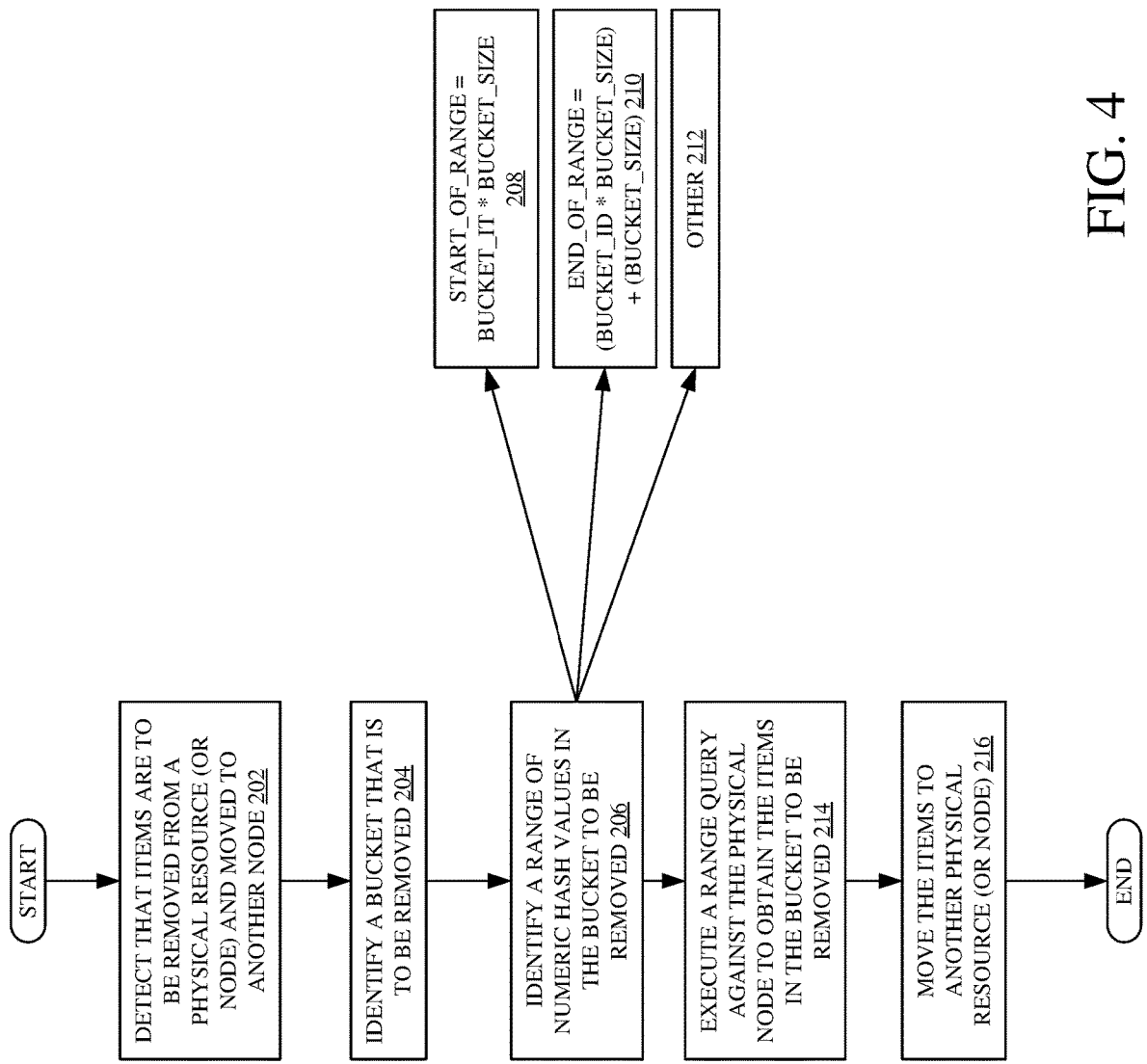

FIG. 4 is a flow diagram illustrating one example of the operation of the architecture illustrated in FIG. 1 in executing a range query against a physical node to obtain items to be removed from that node and moved to another node.

Figure 5:
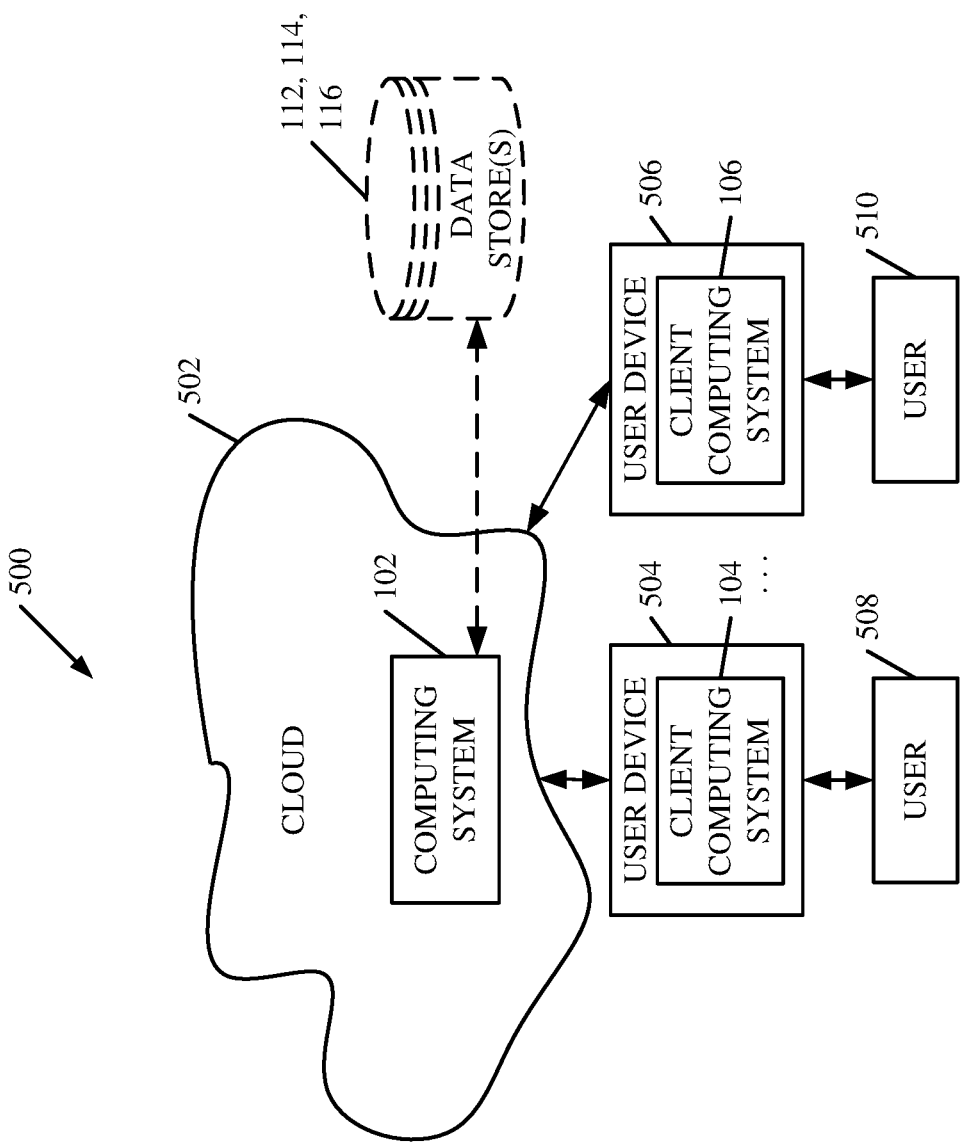

FIG. 5 is a block diagram showing one example of the architecture illustrated in FIG. 1, deployed in a cloud computing architecture.

Figure 6:
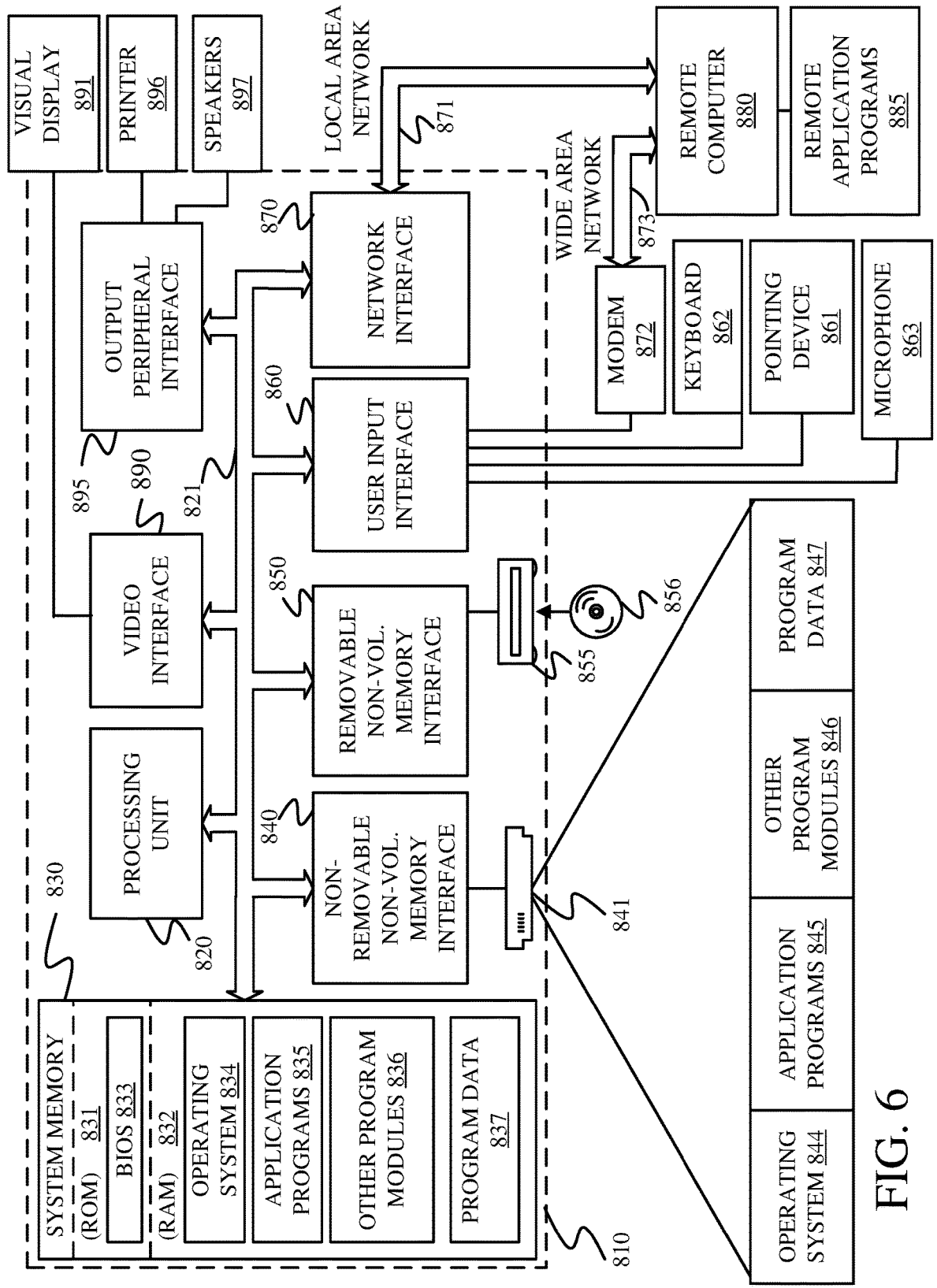

FIG. 6 is a block diagram showing one example of a computing environment that can be used in the architectures shown in the previous figures.

DETAILED DESCRIPTION

As discussed above, distributed computing systems often map items to a set of physical resources, or nodes. Consistent hashing is an approach for performing such mapping in a way that minimizes the number of items that need to be moved among nodes, when the system is resizing, such as adding or removing a node. Some current systems use one of a plurality of different approaches to consistent hashing. These approaches can include variations on consistent hashing, such as rendezvous hashing and jump consistent hashing.

These types of approaches often require a large memory footprint to maintain the map that maps the items to the nodes. The memory footprint grows drastically as nodes are added to the distributed computing system and thus managing the memory footprint can be prohibitive for some systems. Other approaches do not provide uniform distribution. Therefore, incoming items may be preferentially mapped to certain resources, over other resources, thus resulting in a non-uniform or imbalanced mapping of items to the resources. Still other approaches make it virtually impossible to identify a node (or physical resource) where an item resides, without rehashing item identifiers every time a system is resized.

The present description thus proceeds with respect to a system that quickly identifies the placement of an item onto a node of a distributed computing system, based upon the item identifier, without the need to maintain a large map in memory and while ensuring uniform distribution. The present description also proceeds with respect to a system that, whenever the distributed computing system resizes (e.g., grows or shrinks), can quickly generate a range query against a data store to identify an exact range of item identifiers that must be relocated, without scanning the entire data corpus or recomputing hash values for each item on the data corpus.

Briefly, the present system receives an item identifier that identifies the item that is to be allocated to a node in the distributed computing system. The item identifier is hashed to obtain a numeric hash value. The numeric hash value is then deterministically downscaled into a smaller space defined by a defined number of buckets. The bucket where the numeric hash value resides is then deterministically mapped to a node. A bucket that is to be moved (such as during resizing) is first identified and then a range query, corresponding to the range of numeric hash values in that bucket, is executed against the node from which the bucket is to be retrieved. The items in the retrieved bucket can then be moved based upon resizing criteria. The present description thus proceeds with respect to a system that obtains uniform distribution of items across nodes where only an array of physical resources in memory is used to retrieve those items, by performing range queries, so that they can be relocated during resizing. When the present system grows, only a small number of items, on average, from each node need to be reallocated to a newly added node.

FIG. 1 is a block diagram of one example of a computing system architecture 100. Architecture 100 includes computing system 102 that may be accessed by a plurality of different client computing systems 104-106 over network 108. Network 108 can thus be any of a variety of different types of networks, such as a wide area network, a local area network, a near field communication network, a cellular communication network, or any of a wide variety of other networks or combinations of networks.

In the example shown in FIG. 1, computing system 102 can include one or more processors or servers 110, a plurality of different physical data stores 112, 114 and 116, a plurality of different server instances 118, 120 and 122, a front-end system 124, a back-end system 126 and a resource mapping control system 128. Computing system 102 can also have a resource management (provisioning/removal) system 130. In one example, resource mapping control system 128 can include hashing system 132, downscaling system 134, deterministic mapping system 136, resizing system 138, and it can include other items 140. Downscaling system 134 can include deterministic bucket identifier component 142, identifier output component 144, and other items 146.

Resizing system 138 can include resizing detector 148, bucket identifier component 150, range query execution component 152, move component 154, and other items 156. Before describing the operation of computing system architecture 100 in more detail, a brief description of some of the items in architecture 100, and their operation, will first be provided.

In the example shown in FIG. 1, in which computing system 102 is a data storage system, physical data stores 112, 114, and 116 can be data stores deployed on different physical machines. In such an example, system 124 can expose an application programming interface (API) that can be accessed by client computing systems 104-106 in order to provide data items to be stored on physical data stores 112-116, and in order to retrieve or otherwise operate on those data items. Such a request is passed from front-end system 124 to back-end system 126 which interacts with the physical data stores 112-116.

In another example, server instances 118-122 are instances of a server that host a service. Client computing systems 104-106 can make calls to (or requests to) the service through front-end system 124. The requests are passed to back-end system 126 which routes the calls or requests to different ones of the server instances 118-122, based upon workload and other criteria.

In both of these examples (where computing system 102 is a data storage system or a service) the requests or data items that are received are mapped to the physical resources (data stores 112-116 and/or server instances 118-122) by resource mapping control system 128. In one example, resource mapping control system 128 maps the data items or requests to the physical nodes (data stores 112-116 and/or server instances 118-122) in a way that achieves relatively uniform distribution of those data items or requests among the physical nodes, while only needing a relatively small memory footprint (such as an array of physical node identifiers). Also, system 128 deterministically maps the incoming data items or requests against the physical nodes in a way so that the hash values of the item identifiers need not be recomputed when resizing the number of physical nodes and in which range queries on the physical nodes can be executed to extract items that need to be relocated during resizing. Similarly, when a new physical node is added, a minimum, on average, number of items from each node need to be retrieved and relocated to the new node.

Briefly, in operation, hashing system 132 receives an identifier that identifies the incoming item (data item or request). For purposes of the present description, it will be assumed that computing system 102 is a data storage system, and thus the items being received and mapped to the nodes are data items that are to be stored on the physical data stores 112-116. Thus, consistent hashing system 132 receives the data item identifier which may be in the form of a string, and applies a consistent hash function h(x) to that string to obtain a numeric hash value "hash". The consistent hash function h(x) provides a uniform distribution over a wide hash space. For instance, where a 64 bit implementation of the consistent hash function is used, then the consistent hash function provides a uniform distribution of numeric hash values over a hash space S of $2^{64}$ values.

Downscaling system 134 scales the numeric hash value from the hash space (S) down to a smaller space defined by a number B of buckets. This can be done by applying a deterministic arithmetic function such as:

$$\text{bucket\_id} = \text{hash} * (B/S) \quad \text{EQUATION 1}$$

In one example, the number of buckets B is much larger (such as at least one or two orders of magnitude) than the number of physical nodes in the distributed computing system in order to preserve uniform distribution. However, the number of buckets B is small enough such that the number of buckets that need to be relocated during resizing (such as adding nodes to or removing nodes from the distributed computing system) is manageable. Identifier output component 142 outputs the bucket identifier generated by deterministic bucket identifier component 142.

At this point, the uniform distribution of the hashing function h(x) and the downscale function d(x) guarantee that, on average, the same number of item identifiers are assigned to each bucket. Therefore, in order to maintain uniform distribution among the nodes, deterministic mapping system 136 applies a mapping function m(x) that assigns roughly an equal number of buckets to each physical node.

When resizing is occurring (such as when one of the nodes is being removed or another node is being added to the system) resizing detector 148 detects the resizing operation. Bucket identifier component 150 identifies buckets that need to be removed from a node and relocated to another node in order to accommodate the resizing operation. Range query execution component 152 generates and executes a range query against the node from which the bucket is to be removed to retrieve the specific data items that are to be removed from that node. Move component 154 then relocates (e.g., stores) the retrieved data items on the new node, once they are retrieved by range query execution component 152.

Assuming that the number of nodes in the distributed computing system is represented by N, then, when a new node is provisioned, B/N buckets are assigned to the new node.

FIG. 2 is a flow diagram illustrating one example of the operation of resource mapping control system 128 in mapping a data item to a physical data store (or node) 112-116.

Resource mapping control system 128 first receives a string identifying the item to be assigned to one of the physical nodes. This is indicated by block 160 in the flow diagram of FIG. 2. Again, while the present discussion proceeds with respect to an example in which the received item is a data item that is to be stored on a data store, the present discussion could just as easily be made with respect to the received item being a request with a request identifier (a string) that identifies a request that is to be serviced by one of the service instances 118-122. The present discussion is provided for the sake of example only.

Consistent hashing system 132 then hashes the string to obtain a numeric hash value. This is indicated by block 162 in the flow diagram of FIG. 2. In one example, consistent hashing system 132 applies a hash function h(x) that generates outputs according to a uniform distribution. This is indicated by block 164. Also, consistent hashing system 132 illustratively provides the outputs over a defined range of S values, as indicated by block 166. Consistent hashing system 132 can apply a hashing function in other ways as well, and this is indicated by block 168.

Downscaling system 134 then downscales the numeric hash value from the hash space S to a bucket space B. In doing so, deterministic bucket identifier component 142 applies a downscaling function d(x) to the numeric hash value to obtain a bucket identifier that identifies a bucket corresponding to the numeric hash value (e.g., a bucket that will contain hash values in a range within which the numeric hash value falls). This is indicated by block 170. In one example, the downscaling is that identified above in Equation 1. This is indicated by block 172 in the flow diagram of FIG. 2. The downscaling function is also performed in order to preserve uniform distribution among the buckets. This is indicated by block 176. Thus, as discussed above, the number of buckets is much larger than the number of nodes (such as one or more orders of magnitude larger). This is indicated by block 178 in the flow diagram of FIG. 2. The downscaling function can be applied in other ways as well, as indicated by block 180.

Identifier output component 144 then outputs the bucket identifier to deterministic mapping system 136 which maps the bucket to one of the nodes 112-116. Mapping the bucket to a physical resource (or node) 112-116 is indicated by block 182 in the flow diagram of FIG. 2. Again, deterministic mapping system 136 applies a deterministic mapping function m(x) that uniformly assigns the buckets to the number N of physical nodes. This is indicated by block 184. The deterministic mapping system 136 can map the buckets in other ways as well, and this is indicated by block 186.

FIG. 3 is a flow diagram illustrating the operation of resizing system 138 in relocating nodes when the distributed computing system is resized. For the sake of example, it will be assumed that the distributed computing system is being resized by adding a node to the distributed computing system. It will be appreciated, though, that a similar discussion applies when the distributed computing system is reduced in size so that a node is removed. It is first assumed that there are a known number B of buckets in an array of buckets, and there is a single node (N=1). This is indicated by block 190 in the flow diagram of FIG. 3. It is next assumed that deterministic mapping system 136 has assigned all of the buckets to the single node (No). Assigning all the buckets to the single node is indicated by block 192 in the flow diagram of FIG. 3.

At some point, resizing detector 148 detects that a new node has been provisioned in provisioning system 130. In one example, resource management system 130 generates an output indicating when resources are provisioned or eliminated, and provides that output to resizing system 138. Detecting provisioning of a new node is indicated by block 194 in the flow diagram of FIG. 3.

Bucket identifier component 150 then divides the array of all B buckets into groups of N buckets each, with the position of each group in the array being identified by a group index value. Thus, the second group of N buckets in the array has a group index value of 2. The third group of N buckets in the array has a group index value of 3. The fourth group of N buckets in the array has a group index value of 4, etc. This is indicated by block 196 in the flow diagram of FIG. 3.

Bucket identifier component 150 traverses the bucket groups in the array, as indicated by block 198, and assigns equal numbers of buckets from the existing node to the new node. This is indicated by block 200. In addition, where there are multiple existing nodes, bucket identifier component 150 avoids identifying buckets which must be moved from one existing node to another existing node, so that buckets are only moved from existing nodes to the new nodes.

Thus, in one example, bucket identifier component 150 identifies a particular bucket in the current group of buckets under analysis that is to be assigned to the newly provisioned node as follows:

$$\text{Bucket\_ID} = (\text{Group\_Index} + (N-1))\% N \qquad \text{EQUATION 2}$$

Thus, assuming there are 6 groups of buckets, then, in Group 1, bucket 0 would be assigned to the new node. In Group 2, bucket 1 would be assigned to the new node. In Group 3, bucket 2 would be assigned to the new node. In Group 4, bucket 3 would be assigned to the new node. In Group 5, bucket 4 would be assigned to the new node, and in Group 6, bucket 5 would be assigned to the new node. It will be noted that this mechanism for reallocating buckets can be computed in order to assign buckets to the new node in a time that is proportional to N, without an in-memory map.

In another example, a fast, minimal memory consistent hash algorithm (sometimes referred to as jump consistent hash) can be used to provide a similar distribution of buckets to the new node. The jump consistent hash can be computed in log(N) time and without an in-memory map.

FIG. 4 is a flow diagram illustrating one example of the operation of resizing system 138 (and specifically range query execution component 152 and move component 154) in retrieving items from one node and moving them to another node, during resizing. It will be noted that in this way, once the buckets are identified, they can be obtained and moved without accessing an in-memory map and without recomputing or rehashing any values in the various buckets.

It is first assumed that resizing system 138 has detected that items are to be removed from a physical resource or node and moved to another node. This is indicated by block 202 in the flow diagram of FIG. 4. This can be done, as discussed above, by resizing detector 148 detecting that a new node has been provisioned by system 130. Detecting that items need to be removed can be done in other ways as well.

It is also assumed that a bucket that is to be removed from a node has been identified. This is indicated by block 204. Again, this may be done as discussed above with respect FIG. 3, or in other ways. Range query execution component 152 then identifies a range of numeric hash values that reside in the bucket to be removed. This is indicated by block 206.

For example, it is assumed that the buckets have a known bucket size, "Bucket_Size". It is also assumed that each bucket in the array of buckets is represented by a bucket identifier, "Bucket_id". In that case, the start of the range of values of items that are to be removed can be represented as:

Start_Of_Range=Bucket_id*Bucket_Size            EQUATION 3

Similarly, the end of the range of items in the bucket can be identified as follows:

End_Of_Range=(Bucket_id*Bucket_Size)±
(Bucket_Size)                                    EQUATION 4

Identifying the start of the range of items based on the bucket identifier and the bucket size is indicated by block 208, and identifying the end of the range of items based on the bucket identifier and bucket size is indicated by block 210. The range of numeric hash values in the bucket to be removed can be identified in other ways as well, and this is indicated by block 212.

Once the range of items to be removed from the node is known, then range query execution component 152 executes a range query against the physical node to obtain the items in the bucket to be removed. This is indicated by block 214. When those items are retrieved, then move component 154 moves them to the new node, that was just provisioned. This is indicated by block 216. The ability to query items that need to be removed by running a series of range queries allows the computing system 102 to resize without the need to rescan the entire corpus of data, and without rehashing all of the identifiers or items in the corpus.

As discussed above, in order to maintain an acceptable uniform distribution of items among the physical nodes, the number of buckets B should be much larger than the number of physical nodes N.

Table 1 below shows the result of using the systems described above in a resizing operation. The first column in Table 1 shows the initial number of nodes and the second column shows the number of nodes that the system is being resized to. In the example shown, a single node is being provisioned and added to the initial number of nodes. The first row in the following four columns (labeled "Number of Buckets") represents the number of buckets in the distributed computing system. Four different examples are shown in Table 1—examples in which the distributed computing system has 100 buckets, 1,000 buckets, 10,000 buckets, and 100,000 buckets.

The values in the cells in Table 1 show the number of buckets that need to be moved to the new node from the initial set of nodes. For instance, Table 1 shows that where there is one initial node and the system is being resized to have two nodes, then 48 of the 100 buckets are moved using the resizing algorithms discussed above. In an ideal system, this would be exactly half of the 100 buckets (or 50 buckets). Table 1 also shows that where the system has 1,000 buckets, 499 will be moved. Where the system has 10,000 buckets, 5,007 will be moved, and where the system has 100,000 buckets, 50,003 will be moved. Thus, the present system provides exceptionally good performance in relocating buckets during a resizing operation.

TABLE 1

| NUMBER OF NODES | | NUMBER OF BUCKETS | | | |
|---|---|---|---|---|---|
| INITIAL | RESIZE | 100 | 1000 | 10000 | 100000 |
| 1 → | 2 | 48 | 499 | 5007 | 50003 |
| 3 → | 4 | 26 | 246 | 2502 | 25001 |
| 7 → | 8 | 8 | 136 | 1290 | 12558 |
| 15 → | 16 | 7 | 58 | 599 | 6239 |
| 31 → | 32 | 4 | 34 | 334 | 3148 |
| 63 → | 64 | 1 | 10 | 154 | 1548 |
| 127 → | 128 | | 8 | 84 | 775 |
| 255 → | 256 | | 4 | 54 | 406 |
| 511 → | 512 | | 3 | 18 | 196 |
| 1023 → | 1024 | | | 7 | 75 |

It can thus be seen that the entire hashing, downscaling and mapping process is deterministic and can thus be computed without an in-memory map. The hashing process h(x) can be achieved with a time complexity O(S), where S is the length of the item identifier that is being mapped, and with constant memory footprint. The downscale operation d(x) can be computed in constant time. Note that the sizes of B (the number of buckets) and S (the hash space) do not contribute to the time complexity, nor do they contribute to a memory footprint used by the algorithm. This provides a significant advantage in comparison to consistent hashing approaches where the in-memory map grows with the number of nodes and buckets. Similarly, where a jump consistent hash approach is used for mapping m(x), then the mapping can be computed in log(N) time. Similarly, uniform distribution of elements, across the physical resources, is maintained and the hash values of the items associated with the buckets need not be recomputed when resizing. Further, the system enables performing range queries on individual physical resources to retrieve the precise items that need to be located during a resizing operation. For example, when a system grows from N−1 to N nodes, only a minimum of items need to be relocated, on average, and each existing node contributes approximately the same number of items to populate the new node, on average.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, user 508 uses a user device 504 to access those systems through cloud 502. User 510 can use a user device 506 to access system 102 as well.

FIG. 5 also depicts another example of a cloud architecture. FIG. 6 shows that it is also contemplated that some elements of computing system 102 can be disposed in cloud 502 while others are not. By way of example, data stores 112, 114, 116 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, Random Access Memory (RAM), Read-Only Memory (ROM), Electrically Erasable Programmable Read-Only Memory (EEPROM), flash memory or other memory technology, Compact Disc-Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are example and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
a consistent hash system that receives a string identifier, identifying an item to be assigned to one of a plurality of physical resources and applies a hashing function to the string identifier to obtain a numeric hash value uniformly distributed over a hash value space comprising a defined range of values;
a downscaling system that downscales the numeric hash value into a reduced value space of bucket identifiers to obtain a downscaled value corresponding to a selected bucket identifier, the reduced value space of bucket identifiers having fewer values than the hash value space;
a deterministic mapping system that deterministically maps the selected bucket identifier to one of the physical resources; and
a move component that sends the item to the one of the physical resources.

Example 2 is the computer system of any or all previous examples wherein the deterministic mapping system is configured to uniformly, on average, assign bucket identifiers to the plurality of physical resources.

Example 3 is the computer system of any or all previous examples wherein the downscaling system comprises:
a deterministic bucket identifier component configured to deterministically assign the numeric hash value to the selected bucket identifier in the reduced value space.

Example 4 is the computer system of any or all previous examples wherein the deterministic bucket identifier is configured to uniformly, on average, assign numeric hash values to the bucket identifiers in the reduced value space of bucket identifiers.

Example 5 is the computer system of any or all previous examples and further comprising:

a resizing detector configured to detect a resizing input indicative of a change in the plurality of physical resources from a current number of physical resources to a changed number of physical resources; and a bucket identifier component that re-assigns a bucket identifier from a physical resource in the current number of physical resources to a different physical resource in the changed number of physical resources, wherein the move component moves items corresponding to the re-assigned bucket identifier from the physical resource in the current number of physical resources to the different physical resource.

Example 6 is the computer system of any or all previous examples wherein the bucket identifier is configured to uniformly, on average, re-assign bucket identifiers from the current number of physical resources to the changed number of physical resources.

Example 7 is the computer system of any or all previous examples wherein the resizing detector detects resizing input by detecting an added physical resource to the plurality of physical resources and wherein the bucket identifier is configured to re-assign bucket identifiers by dividing the bucket identifiers into a number of groups, each group being identified by a group index value and each group having N buckets where N corresponds to the changed number of physical resources, and re-assigning an equal number of bucket identifiers from each group to the added physical resource.

Example 8 is the computer system of any or all previous examples and further comprising:

a range query execution component that identifies a range of numeric hash values corresponding to the re-assigned bucket identifier, generates a range query based on the identified range of numeric hash values, and executes the range query against the physical resource in the current number of physical resources to retrieve items having numeric hash values in the identified range of numeric hash values, wherein the move component moves the retrieved items to the different physical resource.

Example 9 is the computer system of any or all previous examples wherein each bucket has a bucket size, and wherein the range query execution component is configured to identify a start of the range based on the bucket index value and bucket size and identify an end of the range based on the start of the range and the bucket size.

Example 10 is a computer implemented method, comprising:

receiving a string identifier, identifying an item to be assigned to one of a plurality of physical resources;

applying a hashing function to the string identifier to obtain a numeric hash value uniformly distributed over a hash value space comprising a defined range of values;

downscaling the numeric hash value into a reduced value space of bucket identifiers to obtain a downscaled value corresponding to a selected bucket identifier, the reduced value space of bucket identifiers having fewer values than the hash value space;

deterministically mapping the selected bucket identifier to one of the physical resources; and sending the item to the one of the physical resources.

Example 11 is the computer implemented method of any or all previous examples wherein deterministically mapping the selected bucket identifier to one of the physical resources, comprises:

uniformly, on average, assigning bucket identifiers to the plurality of physical resources.

Example 12 is the computer implemented method of any or all previous examples wherein downscaling comprises:

deterministically assigning the numeric hash value to the selected bucket identifier in the reduced value space.

Example 13 is the computer implemented method of any or all previous examples wherein deterministically assigning comprises:

uniformly, on average, assigning numeric hash values to the bucket identifiers in the reduced value space of bucket identifiers.

Example 14 is the computer implemented method of any or all previous examples and further comprising:

detecting a resizing input indicative of a change in the plurality of physical resources from a current number of physical resources to a changed number of physical resources;

re-assigning a bucket identifier from a physical resource in the current number of physical resources to a different physical resource in the changed number of physical resources; and moving items corresponding to the re-assigned bucket identifier from the physical resource in the current number of physical resources to the different physical resource.

Example 15 is the computer implemented method of any or all previous examples wherein re-assigning a bucket identifier comprises:

uniformly, on average, re-assigning bucket identifiers from the current number of physical resources to the changed number of physical resources.

Example 16 is the computer implemented method of any or all previous examples wherein detecting a re-sizing comprises detecting an added physical resource to the plurality of physical resources and wherein re-assigning bucket identifiers comprises:

dividing the bucket identifiers into a number of groups, each group being identified by a group index value and each group having N buckets where N corresponds to the changed number of physical resources; and re-assigning an equal number of bucket identifiers from each group to the added physical resource.

Example 17 is the computer implemented method of any or all previous examples wherein moving items comprises:

identifying a range of numeric hash values corresponding to the re-assigned bucket identifier;

generating a range query based on the identified range of numeric hash values; and executing the range query against the physical resource in the current number of physical resources to retrieve items having numeric hash values in the identified range of numeric hash values; and moving the retrieved items to the different physical resource.

Example 18 the computer implemented method of any or all previous examples wherein each bucket has a bucket size, and wherein identifying a range comprises:

identifying a start of the range based on the bucket index value and bucket size; and identifying an end of the range based on the start of the range and the bucket size.

Example 19 is a computer system, comprising:
a consistent hash system that receives a string identifier, identifying an item to be assigned to one of a plurality of physical resources and applies a hashing function to the string identifier to obtain a numeric hash value uniformly distributed over a hash value space comprising a defined range of values;
a downscaling system that deterministically downscales the numeric hash value into a reduced value space of bucket identifiers to obtain a downscaled value corresponding to a selected bucket identifier, each bucket identifier corresponding to a range of numeric hash values, the reduced value space of bucket identifiers having fewer values than the hash value space;
a deterministic mapping system that deterministically maps the selected bucket identifier to one of the physical resources; and
a move component that sends the item to the one of the physical resources.

Example 20 is the computer system of any or all previous examples and further comprising:
a resizing detector configured to detect a resizing input indicative of a change in the plurality of physical resources from a current number of physical resources to a changed number of physical resources; and
a bucket identifier component that uniformly, on average, re-assigns bucket identifiers from physical resources in the current number of physical resources to physical resources in the changed number of physical resources; and
a range query execution component that identifies a range of numeric hash values corresponding to each of the re-assigned bucket identifiers, generates a range query based on the identified range of numeric hash values, and executes the range query against the physical resource in the current number of physical resources to retrieve items having numeric hash values in the identified range of numeric hash values, wherein the move component moves the retrieved items to a physical resource in the changed number of physical resources.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
   at least one processor; and
   memory storing instructions executable by the at least one processor, wherein the instructions, when executed, cause the computer system to:
   receive a string identifier, identifying an item to be assigned to one of a plurality of physical resources;
   obtain a numeric hash value based on applying a hashing function to the string identifier, the hashing function configured to generate numeric hash values that are distributed over a hash value space comprising a defined range of values;
   downscale the numeric hash value into a reduced value space of bucket identifiers to obtain a downscaled value corresponding to a selected bucket identifier, the reduced value space of bucket identifiers having fewer values than the hash value space;
   deterministically map the selected bucket identifier to one of the plurality of physical resources;
   detect a change in the plurality of physical resources from a first number of physical resources to a second number of physical resources;
   re-assign a bucket identifier from a physical resource in the first number of physical resources to a different physical resource in the second number of physical resources;
   identify a start of a range of numeric hash values corresponding to the re-assigned bucket identifier based on a group index value and a bucket size;
   identify an end of the range of numeric hash values based on the start of the range of numeric hash values and the bucket size;
   retrieve items having numeric hash values in the range of numeric hash values; and
   move the retrieved items to the different physical resource.

2. The computer system of claim 1, wherein the instructions cause the computer system to:
   deterministically assign the numeric hash value to the selected bucket identifier in the reduced value space; and
   uniformly, on average, assign the bucket identifiers to the plurality of physical resources.

3. The computer system of claim 1, wherein the hashing function is configured to:
   generate, for a plurality of string identifiers that identify items to be assigned to one or more of the plurality of physical resources, a plurality of numeric hash values that are uniformly distributed over the hash value space.

4. The computer system of claim 1, wherein the instructions cause the computer system to uniformly, on average, assign the numeric hash values to the bucket identifiers in the reduced value space of bucket identifiers.

5. The computer system of claim 1, wherein the instructions cause the computer system to uniformly, on average, re-assign bucket identifiers from the first number of physical resources to the second number of physical resources.

6. The computer system of claim 5, wherein the instructions cause the computer system to:
   detect a resizing input by detecting an added physical resource to the plurality of physical resources;
   re-assign the bucket identifiers by dividing the bucket identifiers into a number of groups, each group being identified by a group index value and each group having N buckets where N corresponds to the second number of physical resources, and
   re-assign an equal number of bucket identifiers from each group to the added physical resource.

7. The computer system of claim 1, wherein the instructions cause the computer system to:
   generate a range query based on the range of numeric hash values; and
   execute the range query against the physical resource in the first number of physical resources to retrieve items having numeric hash values in the range of numeric hash values.

8. A computer implemented method, comprising:
   receiving a string identifier, identifying an item to be assigned to one of a plurality of physical resources;
   applying a hashing function to the string identifier to obtain a numeric hash value uniformly distributed over a hash value space comprising a defined range of values;
   downscaling the numeric hash value into a reduced value space of bucket identifiers to obtain a downscaled value corresponding to a selected bucket identifier, each bucket identifier corresponding to a range of numeric hash values, the reduced value space of bucket identifiers having fewer values than the hash value space;

deterministically mapping the selected bucket identifier to one of the plurality of physical resources;

detecting a resizing input indicative of a change in the plurality of physical resources from a current number of physical resources to a changed number of physical resources;

re-assigning a bucket identifier from a physical resource in the current number of physical resources to a different physical resource in the changed number of physical resources;

identifying a start of a particular range of numeric hash values corresponding to the re-assigned bucket identifier based on a group index value and a bucket size;

identifying an end of the particular range of numeric hash values based on the start of the particular range of numeric hash values and the bucket size;

retrieving items having numeric hash values in the particular range of numeric hash values; and moving the retrieved items to the different physical resource.

9. The computer implemented method of claim 8, wherein deterministically mapping the selected bucket identifier to one of the plurality of physical resources, comprises:

uniformly, on average, assigning the bucket identifiers to the plurality of physical resources.

10. The computer implemented method of claim 8, wherein downscaling comprises:

deterministically assigning the numeric hash value to the selected bucket identifier in the reduced value space.

11. The computer implemented method of claim 10, wherein deterministically assigning comprises:

uniformly, on average, assigning numeric hash values to the bucket identifiers in the reduced value space of bucket identifiers.

12. The computer implemented method of claim 8, wherein re-assigning a bucket identifier comprises:

uniformly, on average, re-assigning bucket identifiers from the current number of physical resources to the changed number of physical resources.

13. The computer implemented method of claim 8, wherein detecting a re-sizing comprises detecting an added physical resource to the plurality of physical resources and wherein re-assigning bucket identifiers comprises:

dividing the bucket identifiers into a number of groups, each group being identified by a group index value and each group having N buckets where N corresponds to the changed number of physical resources; and re-assigning an equal number of bucket identifiers from each group to the added physical resource.

14. The computer implemented method of claim 8, and comprising:

generating a range query based on the particular range of numeric hash values; and executing the range query against the physical resource in the current number of physical resources to retrieve the items having numeric hash values in the particular range of numeric hash values.

15. A computer system, comprising:

at least one processor; and memory storing instructions executable by the at least one processor, wherein the instructions, when executed, cause the computer system to:

receive a string identifier, identifying an item to be assigned to one of a plurality of physical resources;

apply a hashing function to the string identifier to obtain a numeric hash value uniformly distributed over a hash value space comprising a defined range of values;

deterministically downscale the numeric hash value into a reduced value space of bucket identifiers to obtain a downscaled value corresponding to a selected bucket identifier, each bucket identifier corresponding to a range of numeric hash values, the reduced value space of bucket identifiers having fewer values than the hash value space;

deterministically map the selected bucket identifier to one of the plurality of physical resources;

detect a resizing input indicative of a change in the plurality of physical resources from a current number of physical resources to a changed number of physical resources;

re-assign a bucket identifier from a physical resource in the current number of physical resources to a different physical resource in the changed number of physical resources;

identify a start of a particular range of numeric hash values corresponding to the re-assigned bucket identifier based on a group index value and a bucket size;

identify an end of the particular range of numeric hash values based on the start of the particular range of numeric hash values and the bucket size;

retrieve items having numeric hash values in the particular range of numeric hash values; and move the retrieved items to the different physical resource.

16. The computer system of claim 15, wherein the instructions, when executed, cause the computer system to:

uniformly, on average, re-assign bucket identifiers from physical resources in the current number of physical resources to physical resources in the changed number of physical resources;

identify a respective range of numeric hash values corresponding to each of the re-assigned bucket identifiers;

generate a range query based on the respective range of numeric hash values; and execute the range query against a physical resource in the current number of physical resources to retrieve items having numeric hash values in the respective range of numeric hash values.

* * * * *